United States Patent
Wang

(10) Patent No.: US 9,780,711 B2
(45) Date of Patent: Oct. 3, 2017

(54) METHOD AND SYSTEM FOR CONTROLLING AN ANGUALR SPEED OF AN INDUCTION MOTOR

(71) Applicant: Mitsubishi Electric Research Laboratories, Inc., Cambridge, MA (US)

(72) Inventor: Yebin Wang, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 313 days.

(21) Appl. No.: 14/612,429

(22) Filed: Feb. 3, 2015

(65) Prior Publication Data

US 2016/0226419 A1 Aug. 4, 2016

(51) Int. Cl.
*H02P 23/00* (2016.01)
*H02P 21/00* (2016.01)
*H02P 21/24* (2016.01)
*H02P 21/13* (2006.01)

(52) U.S. Cl.
CPC .......... *H02P 21/0017* (2013.01); *H02P 21/13* (2013.01); *H02P 21/24* (2016.02)

(58) Field of Classification Search
USPC ................... 318/55, 68, 77, 79, 400.02, 805
See application file for complete search history.

(56) References Cited

U.S. PATENT DOCUMENTS

| | | | |
|---|---|---|---|
| 8,618,756 B2 | 12/2013 | Hung et al. | |
| 8,674,647 B2 | 3/2014 | Iwaji et al. | |
| 8,760,098 B2 | 6/2014 | Qin | |
| 2011/0298405 A1* | 12/2011 | Costanzo | H02P 29/50 318/400.23 |
| 2014/0210386 A1* | 7/2014 | Zhao | H02P 21/36 318/400.02 |

OTHER PUBLICATIONS

C. Schauder, "Adaptive speed identification for vector control of induction motors without rotational transducers," IEEE Transactions on Industry Applications, vol. 28, pp. 1054-1061, Sep./Oct. 1992.

(Continued)

*Primary Examiner* — Eduardo Colon Santana
*Assistant Examiner* — Iftekhar Mustafa
(74) *Attorney, Agent, or Firm* — Gene Vinokur; James McAleenan; Hironori Tsukamoto

(57) ABSTRACT

A system and method controls a rotor angular speed of an induction motor by first sensing an operation condition of the induction motor to produce measured signals, which are transformed by applying a state transformation to an induction motor model to produce a transformed induction motor model. Transformed state estimates of the transformed induction motor model are produced based on the measured signals. An inverse of the state transformation is applied to the transformed state estimates to produce state estimates of the induction motor model, which are then used to determine control input voltages for the induction motor, based on the state estimates, to control the rotor angular speed of the induction motor.

11 Claims, 10 Drawing Sheets

(56) References Cited

OTHER PUBLICATIONS

H. Kubota, K. Matsuse, and T. Nakano, "DSP-based speed adaptive flux observer of induction motor," IEEE Transactions on Industry Applications, vol. 29, pp. 344-348, Mar./Apr. 1993.
H. Kubota and K. Matsuse, "Speed sensorless field-oriented control of induction motor with rotor resistance adaption," IEEE Transactions on Industry Applications, vol. 30, pp. 1219-1224, Sep./Oct. 1994.
K. Ohyama, G. M. Asher, and M. Sumner, "Comparative analysis of experimental performance and stability of sensorless induction motor drives," IEEE Transactions on Industrial Electronics, vol. 53, pp. 178-186, Feb. 2006.
D. J. Atkinson, P. P. Acarnley, and J. W. Finch, "Observers for induction motor state and parameter estimation," IEEE Transactions on Industry Applications, vol. 27, pp. 1119-1127, Nov./Dec. 1991.
M. Hilairet, F. Auger, and E. Berthelot, "Speed and rotor flux estimation of induction machinese using a two-stage extended kalman filter," Automatica, vol. 45, pp. 1819-1827, Aug. 2009.

\* cited by examiner

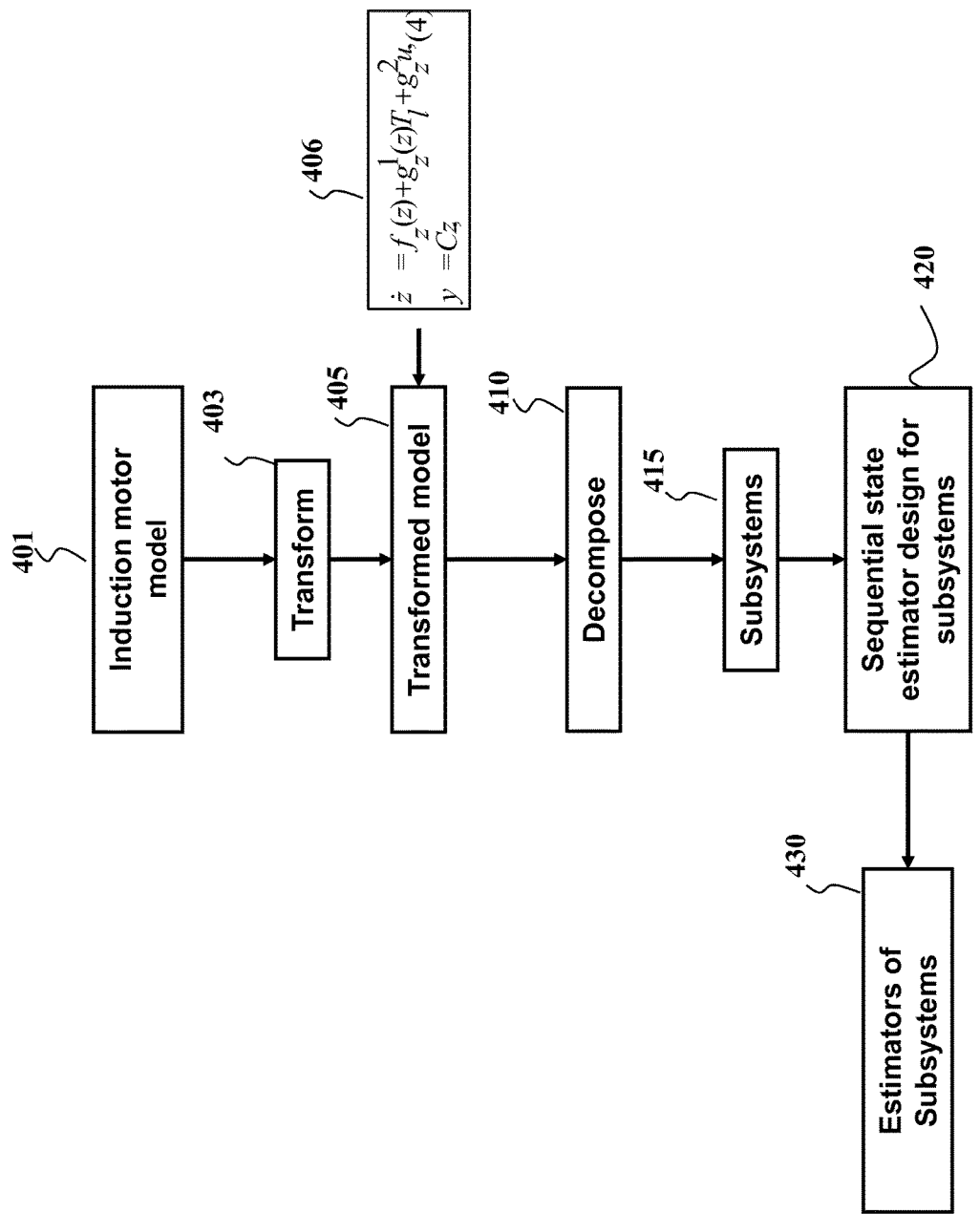

METHOD AND SYSTEM FOR CONTROLLING AN ANGUALR SPEED OF AN INDUCTION MOTOR

RELATED APPLICATION

This U.S. patent application is related to U.S. Ser. No. 14/612,460 (MERL-2783) co-filed herewith Feb. 3, 2015, and incorporated herein. Both Applications disclose a method and system for controlling the angular rotor speed of sensorless induction motors.

FIELD OF THE INVENTION

This invention relates generally to controlling electric motors, and more particularly to sensorless angular speed control of an induction motor.

BACKGROUND OF THE INVENTION

Adjustable speed motor drives for induction motors are widely used in industrial applications due to their low maintenance cost and high performance. However, the control of induction motors is challenging due to highly non-linear dynamics. Among various means, vector (field oriented) control appears to be a good solution and has evolved as a mature technology. Speed sensorless motor drives for electric motors are advantageous in practice by avoiding measuring the motor speed.

The prior art describes speed sensorless control technologies including a voltage model-based direct integration approach, an adaptive observer approach, and an extended Kalman filter approach, etc. The voltage model-based direct integration suffers from accumulation error due to inaccurate measurement.

FIGS. 1B and 2B show a prior art speed sensorless motor drive for an induction motor 104. Input to the motor drive is a reference rotor flux amplitude signal 111. An estimate 112 from a flux estimator block 106 is added to the signal 111 so that the signal 113 represents a difference between signals 111 and 112.

A flux control block 101 determines a stator current 114 used to control the rotor flux linkage in the d-axis. A signal 115 is an an estimate or true stator current, in the d-axis, produced by a flux estimator 106. A difference 116 between the signals 115 and 114 is used by a current control block 103 to determine a reference stator voltage 123 in the d-axis. Similarly, a signal 117 denotes the desired rotor speed reference of the induction motor.

A signal 118 denotes an estimated rotor speed produced by a speed estimator 107 based on output signal 126 of the flux estimator 106. A difference 119 between signals 117 and 118 is used to determine a reference stator current 120, in the q-axis, by a speed control block 102.

An estimated or true stator current 121, in the q-axis, is compared to the reference stator current 120, in an imaginary q-axis used to control the motor torque, to produce a difference signal 122. The current control block 103 determines the stator voltage signals 123, in d- and q-axes, on the basis of difference signals 116 and 122. A Clarke or Park transformation 104 converts the desired stator voltages signals, in d- and q-axes, into three-phase voltages 124 to drive the induction motor 105.

Note that the flux estimator 106 takes the three-phase voltages 124 and sensed 131 phase currents 125 as input signals, and outputs estimated or measured stator currents 115 and 121, an estimated rotor flux amplitude 112, and an estimated rotor speed signal 118 to produce the difference signals 113, 116, 119, and 122. The signal 119 is used for speed control 102.

The performance of the prior art sensorless speed motor drives relies heavily on the performance of the flux and speed estimators 106 and 107.

FIGS. 2A and 2B show prior art estimator methods based on stator currents and voltages signals 211, which are measured by sensors of a sensing induction motor 202 and are assumed in balanced three-phases and in orthogonal stationary frame, and an induction motor model 201. A Clarke transformation 203 is first applied to transform the induction motor model 201 and the sensed signals 211 so that quantities (including variables in the induction motor model and measured signals) in balanced three-phases are converted into quantities in balanced two-phases.

Balanced two-phases quantities, as a result of Clarke transformation of balanced three-phases quantities, are still in orthogonal stationary frame, and thus called quantities in balanced two-phases orthogonal stationary frame. Some prior art further applies Park transformation to the quantities in balanced two-phases orthogonal stationary frame which converts the quantities into quantities in balanced two-phases orthogonal rotating frame.

A block 204 represents an estimator, which is designed on the basis of the induction motor model, as a result of applying Clarke, or Clarke and Park transformations, to produce estimates of stator currents, rotor flux, and rotor speed signals, which are referred here as state coordinates. Note that both Clarke and Park transformations are not state transformation, and thus state variables in the induction motor model bear the same physical meanings after Clarke and Park transformations are applied. This imposes limitations on choices of estimators, and thus leads to unsatisfactory estimation performance. For instance, the voltage model-based direct integration suffers accumulation error due to inaccurate measurement. Adaptive observer and extended Kalman filter approaches yield slow speed tracking performance because the speed is treated as an unknown parameter and its identification is slow.

This fact is elaborated by FIG. 2B, where block 222 represents the unnecessary assumption that the rotor speed is an unknown parameter, and a speed estimator 223 produces the rotor speed estimate based on outputs of block 221 and the assumption 222.

Overall, most prior art speed sensorless motor drives produce limited speed tracking performance because estimator design is performed in fixed state coordinates and under unnecessary assumption (for instance parameter assumption). Performing estimator design for a system with fixed state coordinates fails to exploit the freedom of state transformations, which may simplify the induction motor model thus admit high performance estimators.

SUMMARY OF THE INVENTION

The embodiments of the invention provide a speed sensorless control system and method applicable to motor drives of variable speed induction motors. The embodiments use state transformations of a model of the induction motor to simplify the method.

This invention is based on the realization that a high bandwidth speed sensorless control system is difficult to achieve because the induction motor model in original coordinates is highly coupled, and not in any structure admitting a simple observer design unless certain assumptions are imposed, for instance, treating the rotor speed as an unknown parameter, as in the prior art.

This invention teaches that the state transformation, or change of coordinates, can be introduced to put the induction motor model into certain structures, and thus the induction motor model in new coordinates is partially decoupled. The structured induction motor model typically simplifies the observer design, and leads to high performance in estimation.

The invention further teaches the determination of observer gains to enforce fast convergence of estimation error dynamics. In one embodiment, applying a state transformation to the induction motor model gives a transformed induction motor model such that estimation error dynamics of the rotor flux and stator current in the d-axis are partially decoupled from the rest estimation errors. By enforcing the fast convergence of the estimation error of the rotor flux and stator current in the d-axis, the rest estimation errors dynamics are simplified, and thus the observer gain selection is relatively simple.

In the prior art, the observer gain is based on error dynamics, which are nonlinear, thus the design is complicated, and stability cannot be guaranteed.

BRIEF DESCRIPTION OF THE DRAWINGS

FIGS. 4A and 4B are block diagrams of decomposing a transformed induction motor model into multiple subsystems according to embodiments of the invention;

DETAILED DESCRIPTION OF THE PREFERRED EMBODIMENTS

Figure 1A:
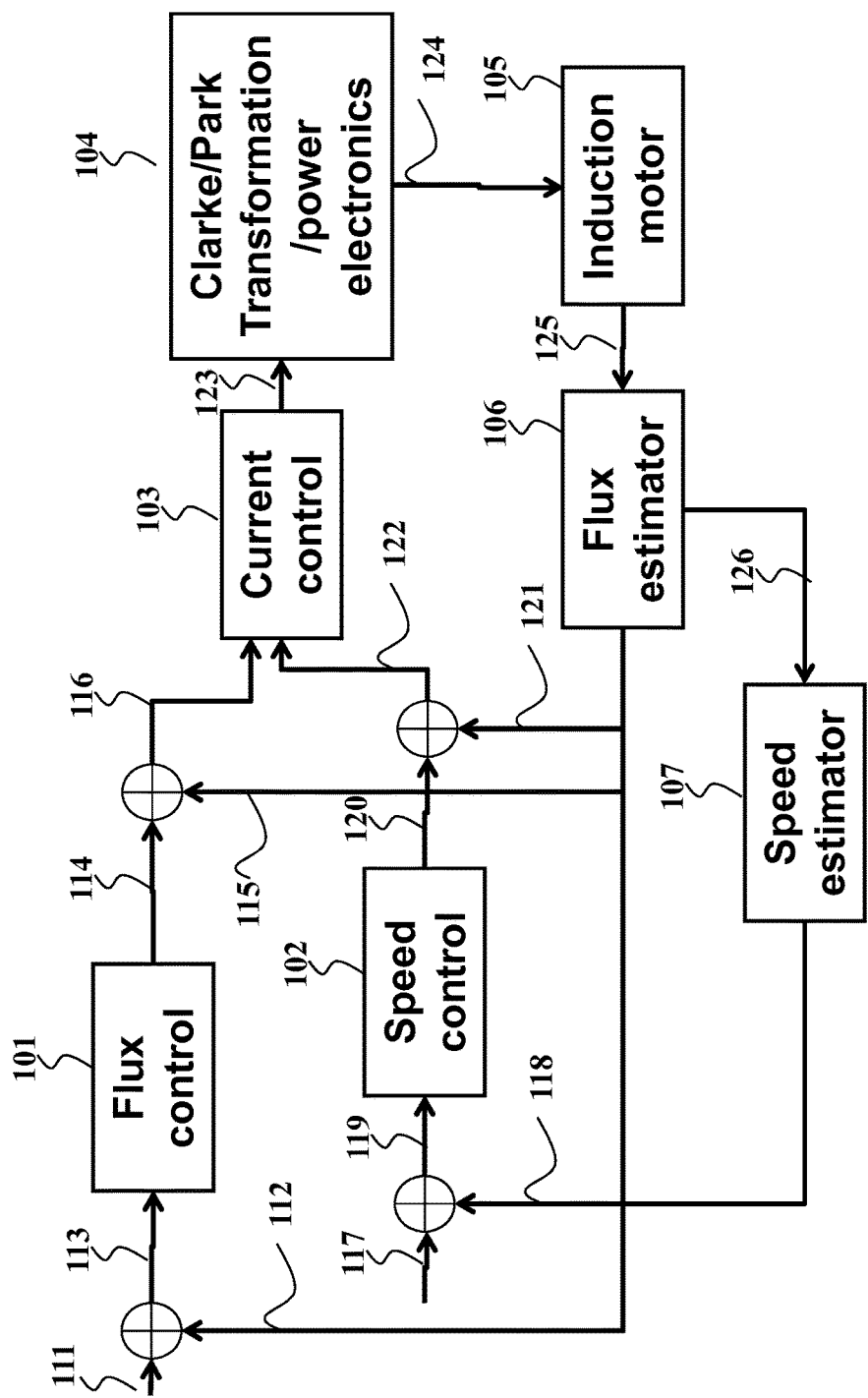
FIGS. 1A and 1B are block diagrams of a prior art sensorless speed motor drive.
Figure 1B:
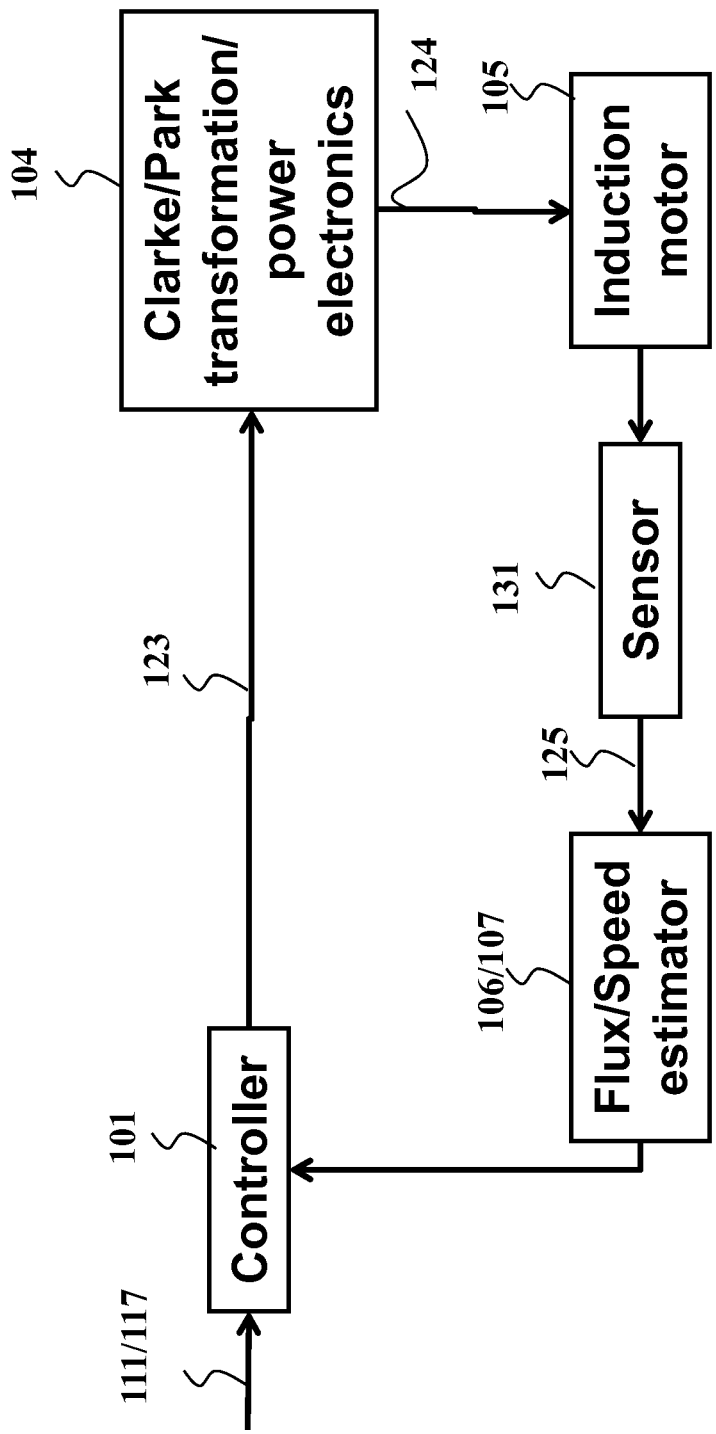
Figure 2A:
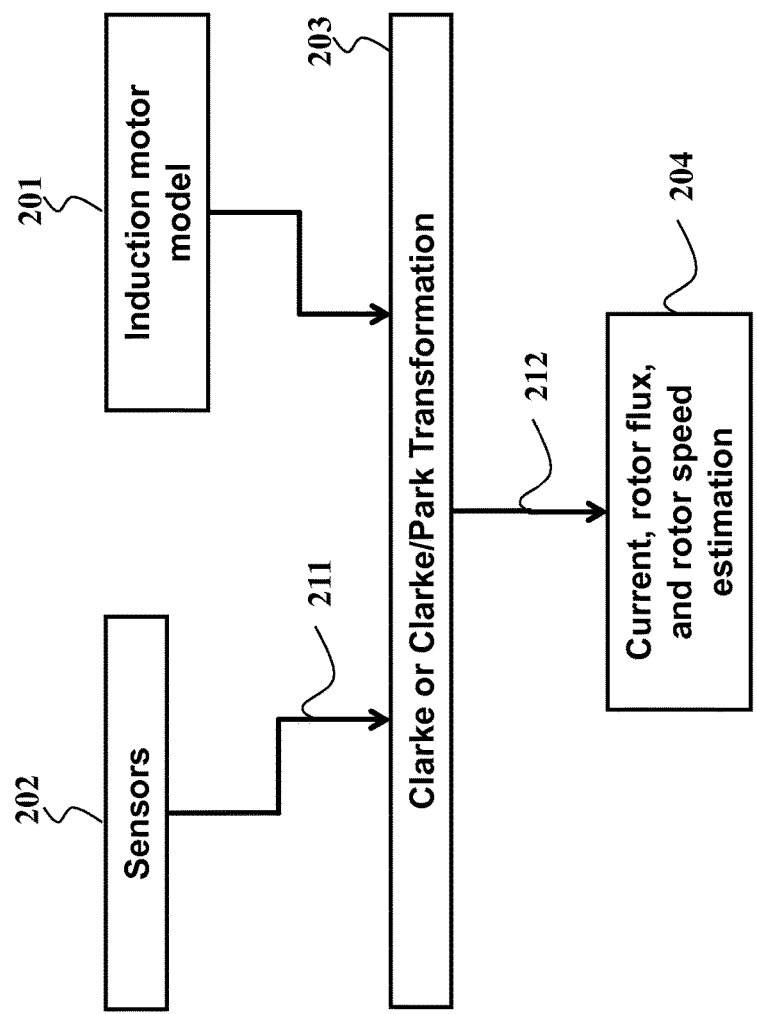
FIGS. 2A and 2B are block diagram of prior art estimator methods based on stator currents and voltages signals.
Figure 2B:
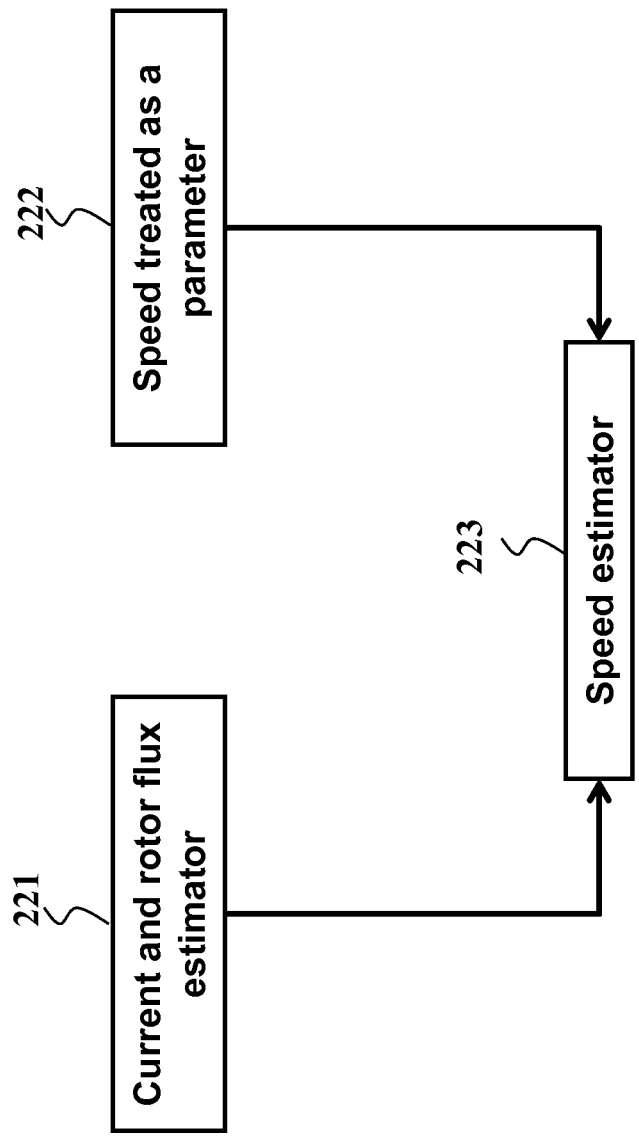

The embodiments of the invention provide a method and system for controlling an angular rotor speed of an induction motor.

To facilitate the detailed description of the embodiments of the invention for a speed sensorless control system and method for induction motors, the following notations are defined. Assume $\zeta$ is a dummy variable, then $\zeta$ denotes a measured variable, $\hat{\zeta}$ denotes an estimate of the variable, and $\tilde{\zeta}=\zeta-\hat{\zeta}$ is an estimation error.

TABLE 1

| Notations | | |
|---|---|---|
| Notation | | Description |
| $\Phi_{dr}, \Phi_{qr}$ | a. | rotor fluxes in d- and q-axes |
| $\omega$ | b. | rotor angular speed |

TABLE 1-continued

| Notations | | |
|---|---|---|
| Notation | | Description |
| $\xi$ | c. | angle of a rotating frame |
| $T_l$ | d. | load torque |
| $J$ | e. | inertia of a rotor and a load |
| $L_s, L_m, L_r$ | f. | stator, mutual, and rotor inductances |
| $R_s, R_r$ | g. | stator and rotor resistances |
| $\omega_1$ | h. | angular speed of a rotating frame |
| $i_{ds}, i_{qs}$ | i. | stator currents in d- and q-axis |
| $u_{ds}, u_{qs}$ | j. | stator voltages in d- and q-axes |
| $\sigma$ | k. | $\dfrac{L_s L_r - L_m^2}{L_s L_r}$ |

Induction Motor Model

A model of the induction motor including stator currents, flux and angular speed as its states. This choice of states define a set of state coordinates, called the original state coordinates, can be expressed by the equations in the following induction motor model $$\begin{aligned}
\dot{i}_{ds} &= -\gamma i_{ds} + \omega_1 i_{qs} + \beta(\alpha\Phi_{dr} + \omega\Phi_{qr}) + \frac{u_{ds}}{L_s\sigma} \\
\dot{i}_{qs} &= -\gamma i_{qs} - \omega_1 i_{ds} + \beta(\alpha\Phi_{qr} - \omega\Phi_{dr}) + \frac{u_{qs}}{L_s\sigma} \\
\dot{\Phi}_{dr} &= -\alpha\Phi_{dr} + (\omega_1 - \omega)\Phi_{qr} + \alpha L_m i_{ds}, \\
\dot{\Phi}_{qr} &= -\alpha\Phi_{qr} - (\omega_1 - \omega)\Phi_{dr} + \alpha L_m i_{qs}, \\
\dot{\omega} &= \mu(\Phi_{dr} i_{qs} - \Phi_{qr} i_{ds}) - \frac{T_l}{J}, \\
y &= [\,i_{ds}\ \ i_{qs}\,]^T,
\end{aligned} \quad (1)$$

where y represents sensed signals, $\omega_1$ is the angular speed of a reference frame, and $$\gamma = \frac{1}{L_s\sigma}\left(R_s + \frac{L_m^2}{L_r}\frac{R_r}{L_r}\right),$$

$$\alpha = \frac{R_r}{L_r},$$

$$\beta = \frac{1}{L_s\sigma}\frac{L_m}{L_r},$$

$$\mu = \frac{2}{3}\frac{L_m}{L_s L_r - L_m^2}.$$

Note that the induction motor model (1) is in an orthognal rotating frame with a rotation speed of $\omega_1$; and quantities $i_{ds}$, $i_{qs}$, $\Phi_{dr}$, $\Phi_{qr}$, $\omega$ are referred as balanced two-phase quantities in orthognal rotating frame, i.e. both Clarke and Park transformations have been applied to arrive at the model (1).

When $\omega_1=0$, the equations in the model (1) reduced to $$\begin{aligned}
\dot{i}_{ds} &= -\gamma i_{ds} + \beta(\alpha\Phi_{dr} + \omega\Phi_{qr}) + \frac{u_{ds}}{L_s\sigma} \\
\dot{i}_{qs} &= -\gamma i_{qs} + \beta(\alpha\Phi_{qr} - \omega\Phi_{dr}) + \frac{u_{qs}}{L_s\sigma} \\
\dot{\Phi}_{dr} &= -\alpha\Phi_{dr} - \omega\Phi_{qr} + \alpha L_m i_{ds}, \\
\dot{\Phi}_{qr} &= -\alpha\Phi_{qr} + \omega\Phi_{dr} + \alpha L_m i_{qs},
\end{aligned} \quad (2)$$

$$\dot{\omega} = \mu(\Phi_{dr}i_{qs} - \Phi_{qr}i_{ds}) - \frac{T_l}{J},$$

$$y = [i_{ds} \ i_{qs}]^T,$$

which represents the induction model without applying a Park transformation. Park transformation are known to those of ordinary skill in the art, and thus not repeated here. In another words, the induction motor model (1) is in orthogonal stationary frame, and quantities $i_{ds}$, $i_{qs}$, $\Phi_{dr}$, $\Phi_{qr}$, $\omega$ are referred as balanced two-phase quantities in orthognal stationary frame, i.e. Clarke transformation has been applied to arrive at the model (1).

Conventional estimator designs are usually based on the model according to Equations (1) or (2), which have the same state coordinates denoted by $(i_{ds}, i_{qs}, \Phi_{dr}, \Phi_{qr}, \omega)^T$. A direct application of existing estimator designs, e.g., sliding mode observer, high gain observer, and a Luenberger observer to the model of Equations (1) or (2) produce an unsatisfactory estimation of stator currents, rotor flux, and the rotor speed due to highly coupled nonlinear terms in the left hand side of differential Equations (1) or (2). For instance, the term $\omega\Phi_{qr}$ in the right hand side of the differential Equation defining $i_{ds}$, i.e., $$\dot{i}_{ds} = -\gamma i_{ds} + \beta(\alpha\Phi_{dr} + \omega\Phi_{qr}) + \frac{u_{ds}}{L_s\sigma}.$$

The induction motor model in Equations (1) or (2) is highly coupled because of the fact that the right hand side of each differential Equation in (1) or (2) depends on almost all state variables. This invention realizes that such a tight coupling poses significant difficulty in design of speed sensorless control motor drives, including controller and estimator design, to achieve high-bandwidth speed control loop. Performing estimator design on the basis of the completely unstructured induction motor model in the original state coordinates, i.e., in Equations (1) or (2), is challenging and ineffective.

This invention realizes introduction of state transformations to represent the induction motor model under different state coordinates might partially break up coupling among state variables, and the resultant induction motor model after applying a state transformation, named after a transformed induction motor model, bears certain structures, which admit simple estimator design. The invention provides a method and system and embodiments for controlling an angular speed of the induction motor by introducing state transformations.

Figure 3:
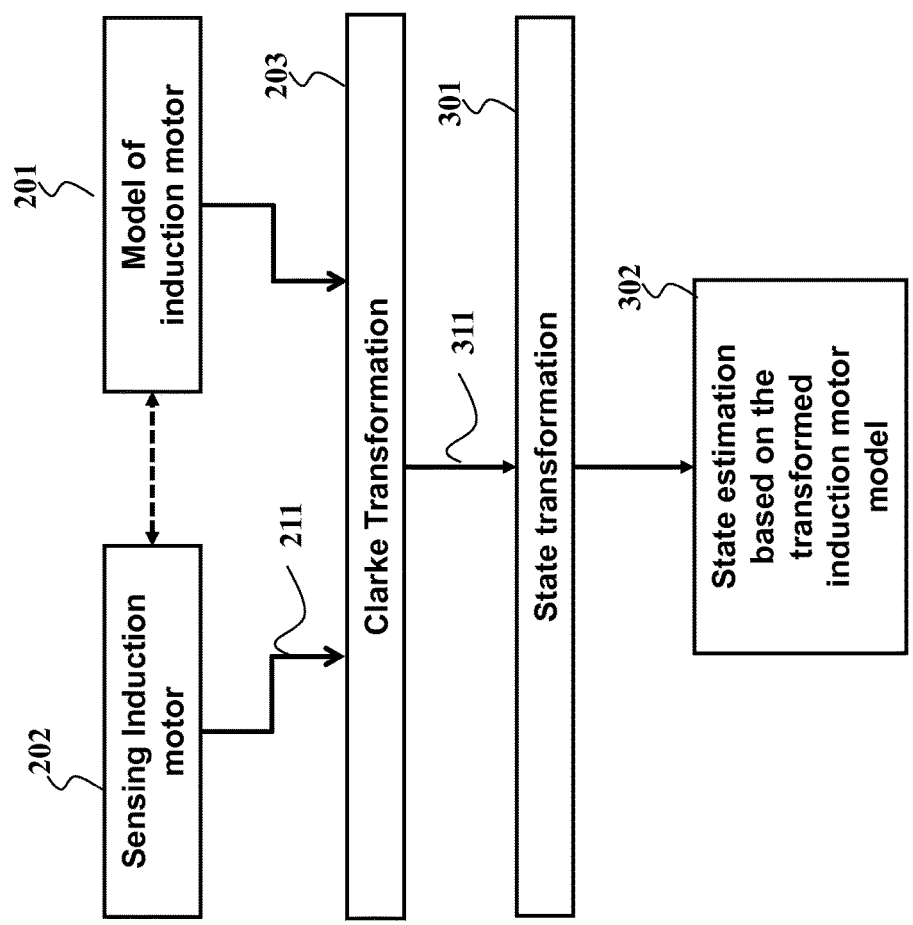
FIG. 3 is a block diagram of a method for estimating a state of an induction motor according to embodiments of the invention.

As shown in FIG. 3, a state transformation 301, which defines a different set of state coordinates and facilities systematic estimator design, is incorporated into the estimator design flow. The state transformation 301 can be performed on the induction models of Equations (1) or (2), i.e., A direct—quadrature—zero (Park) transformation 203 may or may not be present. Applying the state transformation to the induction motor 201 gives a transformed induction motor model, on the basis of which the estimator design 302 is performed.

In one embodiment, the state transformation can be $$z(x) = [i_{ds} \ i_{qs} \ \alpha\Phi_{dr} + \omega\Phi_{qr}, \alpha\Phi_{qr} - \omega\Phi_{dr}, \omega]. \quad (3)$$

where $z = (z_1, z_2, z_3, z_4, z_5)^T$, and T is a transpose operator. One can verify that the state transformation is globally defined and has the inverse transformation $$x(z) = \left[ z_1 \ z_2 \ \frac{\alpha z_3 - z_4 z_5}{\eta} \ \frac{\alpha z_4 + z_3 z_5}{\eta} \ z_5 \right],$$

with $\eta = \alpha^2 + z_5^2$. The transformed induction motor model is written as $$\dot{z} = f_z(z) + g_z^1(z)T_l + g_z^2 u,$$

$$y = Cz, \quad (4)$$

where $g_z^2 = g_x^2$, and $$f_z(z) = \begin{bmatrix} -\gamma z_1 + \omega_1 z_2 + \beta z_3 \\ -\omega_1 z_1 - \gamma z_2 + \beta z_4 \\ \dfrac{\kappa_3(z)}{\eta^2} \\ \dfrac{\kappa_4(z)}{\eta^2} \\ \dfrac{\kappa_5(z)}{\eta} \end{bmatrix},$$

$$g_z^2(z) = \begin{bmatrix} 0 \\ 0 \\ -\dfrac{(\alpha z_4 + z_3 z_5)}{\eta J} \\ \dfrac{(\alpha z_3 - z_4 z_5)}{\eta J} \\ -\dfrac{1}{J} \end{bmatrix}.$$

The terms $\kappa_i, 3 \le i \le 5$ are given by $$\kappa_3 = \alpha^6 L_m z_1 + \alpha^5 L_m z_2 z_5 + 2\alpha^4 L_m z_1 z_5^2 +$$
$$2\alpha^3 L_m z_2 z_5^3 + \alpha^2 L_m z_1 z_5^4 + \alpha L_m z_2 z_5^5 - \alpha^2 \mu z_1 z_4^2 + \alpha^2 \mu z_2 z_3 z_4 -$$
$$2\alpha\mu z_1 z_3 z_4 z_5 + \alpha\mu z_2 z_3^2 z_5 - \alpha\mu z_2 z_4^2 z_5 - \mu z_1 z_3^2 z_5^2 - \mu z_2 z_3 z_4 z_5^2 -$$
$$\alpha^5 z_3 - \alpha^4 z_4 z_5 - 2\alpha^3 z_3 z_5^2 - 2\alpha^2 z_4 z_5^3 - \alpha z_3 z_5^4 - z_4 z_5^5,$$

$$\kappa_4 = \alpha^6 L_m z_2 - \alpha^5 L_m z_1 z_5 + 2\alpha^4 L_m z_2 z_5^2 - 2\alpha^3 L_m z_1 z_5^3 +$$
$$\alpha^2 L_m z_2 z_5^4 - \alpha L_m z_1 z_5^5 + \alpha^2 \mu z_1 z_3 z_4 - \alpha^2 \mu z_2 z_3^2 + \alpha\mu z_1 z_3^2 z_5 -$$
$$\alpha\mu z_1 z_4^2 z_5 + 2\alpha\mu z_2 z_3 z_4 z_5 - \mu z_1 z_3 z_4 z_5^2 - \mu z_2 z_4^2 z_5^2 -$$
$$\alpha^5 z_4 + \alpha^4 z_3 z_5 - 2\alpha^3 z_4 z_5^2 + 2\alpha^2 z_3 z_5^3 - \alpha z_4 z_5^4 + z_3 z_5^5,$$

$$\kappa_5 = -\mu[\alpha(z_1 z_4 - z_2 z_3) + (z_1 z_3 + z_2 z_4) z_5].$$

Figure 4A:
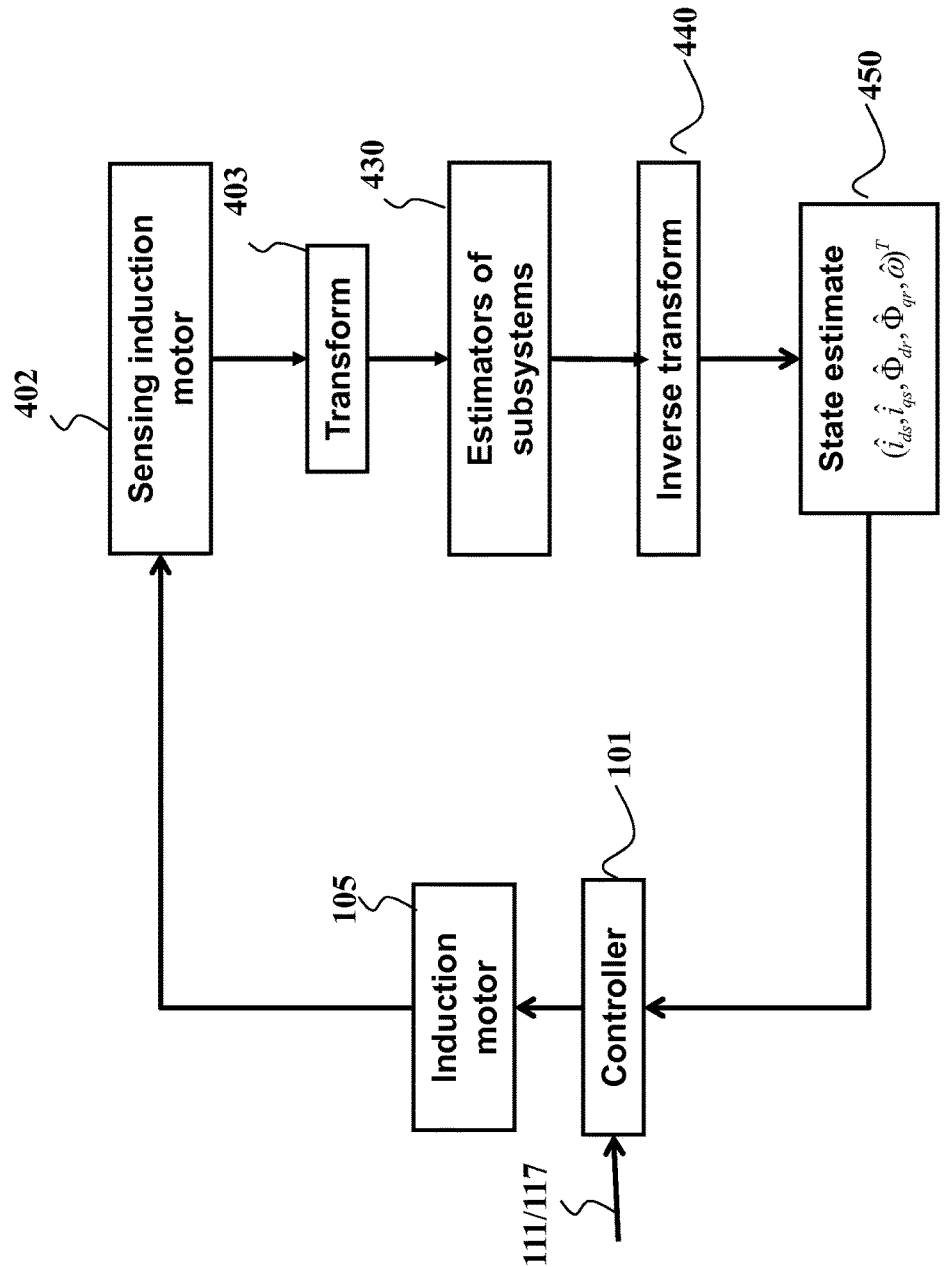

FIGS. 4A and 4B show the steps of methods and the structure of a system for controlling the angular speed of the the induction motor according to embodiments of the invention. The method and system can be implemented in a microcontroller, field programmable gate array (FPGA), digital signal processor (DSP), or custom logic.

In FIG. 4A, a block 402 measures stator voltages and currents of the induction motor during operation. Both the stator voltages and currents are transformed using block 403 according to the state transformation to new coordinates, and fed into estimators of subsystems 430 to produces transformed state estimates of the transformed induction motor model. An inverse state transformation using block 440 is applied to the transformed state estimatess of the transformed induction motor model to produce the state estimate 450 of the induction motor model. Then, the controller 101 determines a control command to control the angular rotor speed of the induction motor 105 based on the state estimate 450.

FIG. 4B shows the steps for designing the estimators of subsystems on the basis of the induction motor model 401. A state transformation 403 is applied to the model 401 of the induction motor 402, see FIG. 4A, to obtain a transformed induction motor model 405. The transformed model is decomposed 410 into a set of subsystems 415 using Equations (4) 406. Estimators of subsystems 430 are designed by applying a sequential state estimator design technique 420. That is, the states of previous subsystems are known for subsequent subsystems, as described in detail below.

Figure 5:
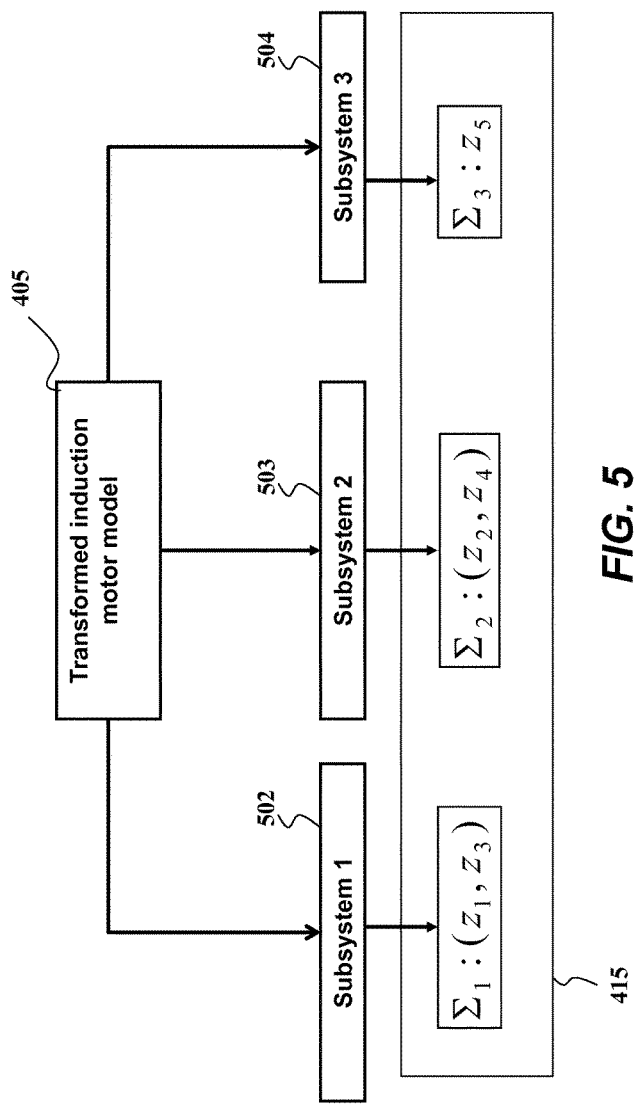
FIG. 5 is a block diagram of decomposing a transformed induction motor model into multiple subsystems according to embodiments of the invention.

FIG. 5 shows one embodiment of decomposition where the transformed induction motor model 405, represented by Equation (4), is decomposed into a set of three subsystems 502, 503, and 504. The states of the three subsystem 415 are, for example, respectively $\Sigma_1 : (z_1, z_3)$, $\Sigma_2 : (z_2, z_4)$, and $\Sigma_3 : z_5$.

By verifying certain assumptions, for example, all states $z$ are bounded, and subsystems $\Sigma_1$ and $\Sigma_2$ have certain structures, various systematic estimator design techniques such as a high gain observer or a finite time convergent observer of the states can be applied to produce state estimates $\hat{z}^1$, $\hat{z}^2$. The resultant estimators for subsystems $\Sigma_1$ and $\Sigma_2$ guarantees that estimation errors, i.e., a difference between the true state $z^1$, $z^2$ and its estimate $\hat{z}^1, \hat{z}^2$, are bounded or convergent to zero.

Figure 6A:
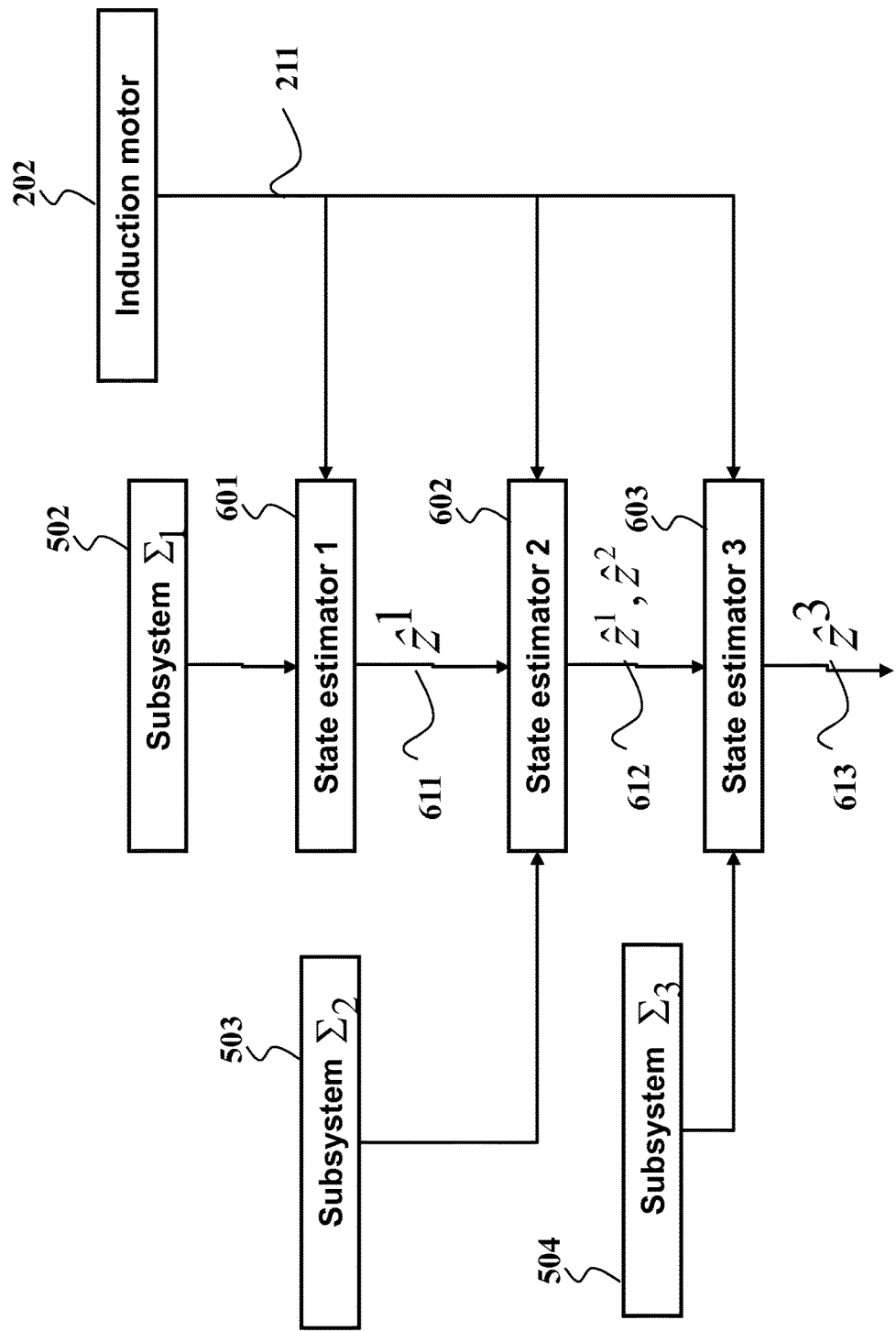
FIG. 6A is a block diagram of one embodiment of the sequential design based on the decomposition of the transformed induction motor model as shown in FIG. 5.

FIG. 6A shows one embodiment of sequential estimator design based on the decomposition of the transformed induction motor model (4) according to FIG. 5. A state estimator 601 for subsystem $\Sigma_1$ 502 is designed on the basis of the sensed stator current and voltage signals 211 and the model of subsystem $\Sigma_1$ to produce the state estimate $\hat{z}^1$ 611 of the state $z^1$ of subsystem $\Sigma_1$. A state estimator 602 for subsystem $\Sigma_2$ is designed on the basis of the sensed stator current and voltage signals 211, estimated state 611, and the model of subsystem $\Sigma_2$ 503 to produce the state estimate $\hat{z}^2$ 612 of the state $z^2$ of subsystem $\Sigma_2$. A state estimator 603 is designed on the basis of stator current and voltage signals 211, estimated states 611 and 612, and the model of subsystem $\Sigma_3$ 504, to produce the state estimate $\hat{z}^3$ 613, of the state $z^3$ of subsystem $\Sigma_3$.

Note that while designing the state estimator 601, state variables $z^2$ and $z^3$ appearing in the model of $\Sigma_1$ are treated as bounded uncertainties. Similarly, while designing the state estimator 602, state variable $z^3$ appearing in the model of $\Sigma_2$ is treated as bounded uncertainties, on the other hand, state variable $z^1$ appearing in the model of $\Sigma_2$ is treated as known and replaced by $\hat{z}^1$; while the design the state estimator 603, both state variables $\hat{z}^1$ and $\hat{z}^2$ are treated as known and replaced by $\hat{z}^1$ and $\hat{z}^2$ respectively.

As an example, a high gain observer technique can be applied to design estimators 601 and 602. While designing estimators using high gain observer technique, one can treat $$\frac{\kappa_3}{\eta^2}$$

as uncertainties bounded by $L_1 > 0$, and design the estimator 601 for the subsystem $\Sigma_1$ as follows $$\dot{\hat{z}}^1 = \begin{bmatrix} -\gamma \hat{z}_1 + \beta \hat{z}_3 \\ 0 \end{bmatrix} + \begin{bmatrix} l_1 \\ l_3 \end{bmatrix}(z_1 - \hat{z}_1),$$

where $l_3 \gg l_1 \gg 0$ depend on the bound of uncertainties.

Similarly, $$\frac{\kappa_4}{\eta^2}$$

can be treated as uncertainties bounded by $L_2$, and the estimator 602 for subsystem $\Sigma_2$ takes the following expression $$\dot{\hat{z}}^2 = \begin{bmatrix} -\gamma \hat{z}_2 + \beta \hat{z}_4 \\ 0 \end{bmatrix} + \begin{bmatrix} l_2 \\ l_4 \end{bmatrix}(z_2 - \hat{z}_2),$$

where $l_4 \gg l_2 \gg 0$ depend on $L_2$. Similarly, with $z^1$ treated as known and replaced by $\hat{z}^1$, the estimator 602 for subsystem $\Sigma_2$ can also be taken as follows $$\dot{\hat{z}}^2 = \begin{bmatrix} -\gamma \hat{z}_2 + \beta \hat{z}_4 \\ \frac{\hat{\kappa}_4}{\hat{\eta}^2} \end{bmatrix} + \begin{bmatrix} l_2 \\ l_4 \end{bmatrix}(z_2 - \hat{z}_2),$$

where $\hat{\eta} = \alpha^2 + \hat{z}_5^2$, $\hat{\kappa}_4 = \kappa(z_1, z_2, \hat{z}_3, \hat{z}_4, \hat{z}_5)$.

Another embodiment of estimators 601 and 602 can be obtained by applying finite time convergent observer design techniques for both subsystems. For instance, a finite time convergent observer for $\Sigma_2$ is $$\dot{\hat{z}}^2 = \begin{bmatrix} -\gamma \hat{z}_2 + \beta \hat{z}_4 \\ 0 \end{bmatrix} + \begin{bmatrix} l_2 \\ l_4 \end{bmatrix} \text{sign}\{(z_2 - \hat{z}_2)\},$$

where sign$\{\epsilon\}$ is an operator given by $$\text{sign}\{\varepsilon\} = \begin{cases} 1, & \text{if } \varepsilon > 0, \\ -1, & \text{otherwise} \end{cases}.$$

One embodiment of estimator 603 has the following form $$\dot{\hat{z}}_5 = l_{51}(z_1 - \hat{z}_1) + l_{52}(z_2 - \hat{z}_2) - \frac{\mu}{\hat{z}_5}[\rho_1(t)\alpha + \rho_2(t)\hat{z}_5],$$

where $l_{51}$ and $l_{52}$ are estimator gains, and $\rho_1(t) = 2\mu\alpha(z_1\hat{z}_4 - z_2\hat{z}_3)$, and $\rho_2(t) = 2\mu(z_1\hat{z}_3 + z_2\hat{z}_4)$ If the sign of rotor rotation is known, another embodiment of estimator 603 is $$\dot{\hat{z}}_5 = l_{51}\left[\hat{\Phi}_{qr}(z_1 - \hat{z}_1) - \hat{\Phi}_{dr}(z_2 - \hat{z}_2)\right] - \frac{1}{\hat{z}_5}\left[\rho_1(t)\sqrt{\hat{z}_5 - \alpha^2} + \rho_2(t)(\hat{z}_5 - \alpha^2)\right], \quad (5)$$

where $l_{51}$ and $l_{52}$ are constant, and $$\hat{z}_5 = \sqrt{\hat{z}_5}\,\text{sign}(z_5).$$

Figure 6B:
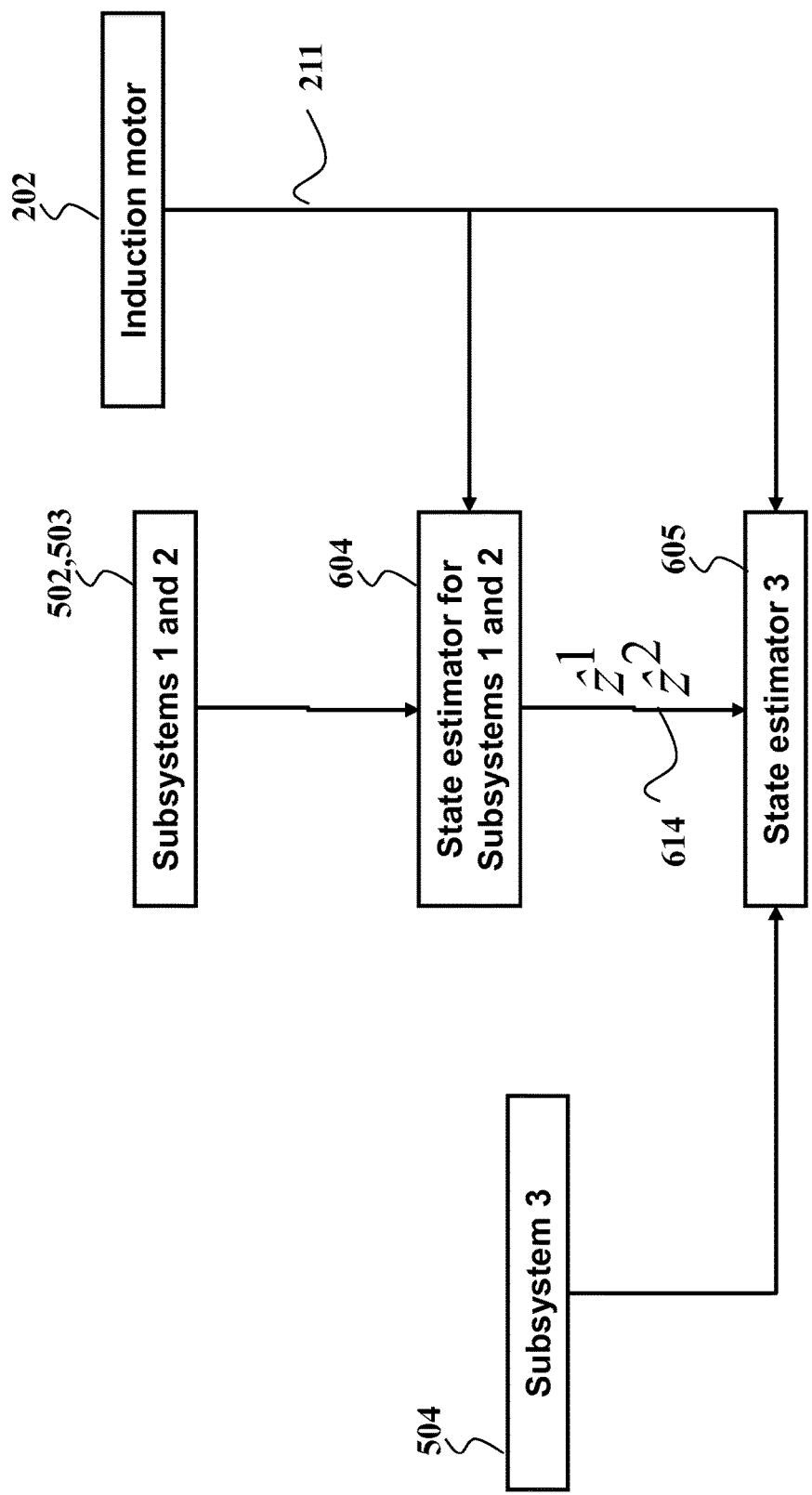
FIG. 6B is a block diagram of another embodiment of the sequential design based on the decomposition of the transformed induction motor model as shown in FIG. 5.

FIG. 6B shows another embodiment of sequential design based on the decomposition of the transformed induction motor model according to FIG. 5. A state estimator 604 for subsystems $\Sigma_1$ and $\Sigma_2$ is designed on the basis of the sensed stator current and voltage signals 211 and the models of subsystems $\Sigma_1$ and $\Sigma_2$, denoted by block 502 and 503, to produce the state estimate $\hat{z}^1$ and $\hat{z}^2$ 614, of the state $z^1$ and $z^2$, respectively. The state estimator 605 for subsystem $\Sigma_3$ is designed on the basis of the sensed stator current and voltage signals, the estimated state 614, and the model of subsystem $\Sigma_3$ block 504 to produce the state estimate $\hat{z}^3$ 613 of the state $z^2$, see FIG. 6A.

In one embodiment, the estimator 604 for subsystems $\Sigma_1$ and $\Sigma_2$ is $$\begin{bmatrix}\dot{\hat{z}}^1\\ \dot{\hat{z}}^2\end{bmatrix} = \begin{bmatrix}-\gamma z_1 + \beta \hat{z}_3\\ -\gamma z_2 + \beta \hat{z}_4\\ \frac{\hat{\kappa}_3}{\hat{\eta}^2}\\ \frac{\hat{\kappa}_4}{\hat{\eta}^2}\end{bmatrix} + \begin{bmatrix}\theta I_2 & 0\\ 0 & \theta^2 I_2\end{bmatrix}S^{-1}\bar{C}(y - \hat{y}), \quad (5)$$

$$\hat{y} = [\hat{z}_1 \ \hat{z}_2]^T$$

where $\hat{z}^1$ and $\hat{z}^2$ are estimates of $z_1$ and $z_2$, respectively, $$\hat{\kappa}_3 = \kappa_3(z_1, z_2, \hat{z}_3, \hat{z}_4, \hat{z}_5),$$

$$I_2 = \begin{bmatrix}1 & 0\\ 0 & 1\end{bmatrix},$$

$$\bar{C} = \begin{bmatrix}I_2\\ 0\\ 0\end{bmatrix},$$

and S is a matrix determined by solving $$S + A^T S + SA = CC^T$$

with $$A = \begin{bmatrix}0 & 0 & 1 & 0\\ 0 & 0 & 0 & 1\\ 0 & 0 & 0 & 0\\ 0 & 0 & 0 & 0\end{bmatrix}.$$

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for controlling a rotor angular speed of an induction motor, comprising steps of:
    sensing an operation condition of the induction motor to produce measured signals;
    transforming the measured signal by applying a state transformation to an induction motor model to produce a transformed induction motor model;
    producing transformed state estimates of the transformed induction motor model based on the measured signals, wherein the transformed state estimates of the transformed induction motor model are produced by a set of estimators of a set of subsystems of the transformed induction motor model, wherein the set of the subsystems are determined by applying the state transformation to the induction motor model to obtain the transformed induction motor model; decomposing the transformed induction motor model into the set of the subsystems; and designing a state estimator of each subsystem by treating states of previous subsystems as known;
    applying an inverse of the state transformation to the transformed state estimates to produce state estimates of the induction motor model;
    determining control input voltages to the induction motor based on the state estimates; and
    applying the control input voltages to the induction motor to control the rotor angular speed.

2. The method of claim 1, wherein the measured signals are stator voltages and currents of the induction motor.

3. The method of claim 1, wherein states of the set of the subsystems are estimated sequentially so the states for a previous subsystems are known for subsequent subsystems.

4. The method of claim 1, wherein a particular state transformation is,
    where i_ds,i_qs,$\phi$_dr,$\phi$_qr,$\omega$ denote a stator current in a d-axis, a state current in q-axis, a rotor flux in the d-axis, a rotor flux in a q-axis, and the rotor angular speed, respectively, and $\alpha$ is predetermined constant.

5. The method of claim 4, wherein the set of the subsystems comprises a subsystem with states (i_ds,$\alpha\phi$_dr+$\omega\phi$_qr), a subsystem with states (i_qs,$\alpha\phi$_qr-$\omega\phi$_dr), and a subsystem with states $\omega$.

6. The method of claim 4, where the set of the subsystems comprises a subsystem with states (i_ds,$\alpha\phi$_dr+$\omega\phi$_qr,i_qs, $\alpha\phi$_qr-$\omega\phi$_dr), and a subsystem with states $\omega$.

7. The method of claim 4, wherein a particular state transformation is $$\bar{z} = [i\_ds, i\_qs, \beta\phi\_dr + i\_ds, \beta\phi\_qr + i\_qs, \omega],$$

where $\bar{z}$ denotes new coordinates, and $\beta$ is a predetermined constant.

8. The method of claim 4, where the set of the subsystems comprise a subsystem with states (i_ds,i_qs,$\beta\phi$_dr+i_ds, $\beta\phi$_qr+i_qs), and a subsystem with states $\omega$.

9. The method of claim 1, wherein a high gain observer is used for each subsystem.

10. The method of claim 1, wherein a finite time convergent observer is used for each subsystem.

11. A system for controlling a rotor angular speed of an induction motor, comprising:
    a sensor configured to sense an operation condition of the induction motor to produce measured signals;

a transformation block configured to transform the measured signal by applying a state transformation to an induction motor model to produce a transformed induction motor model;

means for producing transformed state estimates of the transformed induction motor model based on the measured signals, and applying an inverse of the state transformation to the transformed state estimates to produce state estimates of the induction motor model, wherein the transformed state estimates of the transformed induction motor model are produced by a set of estimators of a set of subsystems of the transformed induction motor model, wherein the set of the subsystems are determined by applying the state transformation to the induction motor model to obtain the transformed induction motor model; decomposing the transformed induction motor model into the set of the subsystems; and designing a state estimator of each subsystem by treating states of previous subsystems as known;

means for determining control input voltages to the induction motor based on the state estimates, and applying the control input voltages to the induction motor to control the rotor angular speed.

* * * * *

UNITED STATES PATENT AND TRADEMARK OFFICE
CERTIFICATE OF CORRECTION

PATENT NO. : 9,780,711 B2
APPLICATION NO. : 14/612429
DATED : October 3, 2017
INVENTOR(S) : Yebin Wang Page 1 of 1

It is certified that error appears in the above-identified patent and that said Letters Patent is hereby corrected as shown below:

On the Title Page

Item [54] and in the Specification, Column 1, Line 1, in the title, add -- Angular -- and delete the text "Angualr"

Signed and Sealed this
Twenty-fourth Day of October, 2017

Joseph Matal
*Performing the Functions and Duties of the
Under Secretary of Commerce for Intellectual Property and
Director of the United States Patent and Trademark Office*